(12) United States Patent
Zhang

(10) Patent No.: US 6,595,235 B1
(45) Date of Patent: Jul. 22, 2003

(54) TWO-WAY ORIFICE SEAT

(75) Inventor: GangFu Zhang, Gastonia, NC (US)

(73) Assignee: Hays Fluid Controls, a divison of Romac Industries, Inc., Dallas, NC (US)

( * ) Notice: Subject to any disclaimer, the term of this patent is extended or adjusted under 35 U.S.C. 154(b) by 0 days.

(21) Appl. No.: 10/355,432

(22) Filed: Jan. 31, 2003

(51) Int. Cl.[7] .............................. G05D 7/01; F16K 43/00
(52) U.S. Cl. .................. 137/270; 137/329.01; 251/359
(58) Field of Search ................................ 137/270, 269, 137/329.01, 329.02, 329.03, 329.04; 251/359

(56) References Cited

U.S. PATENT DOCUMENTS

| | | | |
|---|---|---|---|
| 3,138,177 A | | 6/1964 | Cutler |
| 3,746,263 A | * | 7/1973 | Reeder et al. ...... 137/329.01 X |
| 3,768,507 A | | 10/1973 | Dicken, Jr. |
| 3,836,083 A | | 9/1974 | Bell |
| 3,958,603 A | | 5/1976 | Bannon et al. |
| 3,995,664 A | | 12/1976 | Nelson |
| 4,105,050 A | | 8/1978 | Hendrickson et al. |
| 4,165,764 A | | 8/1979 | Grandclement |
| 4,197,874 A | * | 4/1980 | Neff ............................ 137/270 |
| 4,344,459 A | | 8/1982 | Nelson |
| 4,423,752 A | * | 1/1984 | Psarouthakis ........... 137/270 X |
| 5,295,506 A | | 3/1994 | Smith |
| 5,409,042 A | | 4/1995 | Kirchner |
| 6,311,712 B1 | | 11/2001 | Meyer |
| 6,390,122 B1 | | 5/2002 | Zhang et al. |

* cited by examiner

*Primary Examiner*—Kevin Lee
(74) *Attorney, Agent, or Firm*—Alston & Bird LLP

(57) ABSTRACT

There are provided a fluid flow control valve and an orifice for a fluid flow control valve. The orifice defines two seats against which a diaphragm of the valve can be urged. Each seat defines a particular contour, including one or more channels, slots, and or protrusions that form flow control passages through which fluid flows between the diaphragm and the orifice. The orifice can be configured in either of two orientations so that either seat can be disposed toward the diaphragm. As the pressure differential across the valve increases, the diaphragm is urged more firmly against the seat facing the diaphragm and the diaphragm partially closes the flow control passages, thereby regulating the flow to a substantially uniform volumetric rate. The contours of the two seats can be the same, or each seat can be different to provide a unique controlled flow rate.

33 Claims, 5 Drawing Sheets

TWO-WAY ORIFICE SEAT

BACKGROUND OF THE INVENTION

1. Field of the Invention

The invention relates to fluid flow control valves and, more particularly, to a fluid flow control valve having an orifice that defines a seat. An elastomeric diaphragm is urged against the seat by a pressure differential occurring across the diaphragm so that fluid flows through flow control passages defined between the diaphragm and the seat. Increasing pressure differential across the diaphragm causes the diaphragm to constrict the flow control passages through deflection of the diaphragm.

2. Description of Related Art

Fluid flow control valves are used for regulating fluid flow to a substantially constant flow rate over a range of pressure differentials, such as about 0.1 bar to 10 bars. In such valves, the diaphragm typically comprises a solid body of elastomeric material. When urged against a seat of an orifice, the diaphragm deforms, the degree of deformation increasing with increasing pressure differential across the diaphragm. As the deformation of the diaphragm increases, the flow control passages between the diaphragm and the seat become smaller. The valve is designed such that over the range of pressure differentials of interest, the changing flow area of the flow control passages offsets the changing pressure differential so as to maintain the flow rate substantially constant.

U.S. Pat. No. 6,390,122 to Zhang, et al. and assigned to the assignee of the present invention describes a fluid flow control valve that has a housing with a fluid flow passage that extends therethrough between openings for flow into and out of the fluid flow passage. An orifice with a seat at one end is disposed in the passage, and a diaphragm is disposed in the passage so that an end face of the diaphragm opposes the seat of the orifice. The seat is configured so that one or more flow control passages are defined between the seat and the end face of the diaphragm. In normal forward flow through the valve, fluid flows between the outer peripheral surface of the diaphragm and the inner surface of the housing and then is turned radially inwardly by the orifice and flows through the flow control passages between the end face of the diaphragm and the orifice seat. The seat can be contoured to include at least two different shapes of channels, each promoting localized bending of the diaphragm at a different pressure differential and thereby permitting an expansion of the working pressure range to very low pressure differentials.

The valve described above is designed to control the flow of fluids over a particular range of pressure differentials and to achieve a particular desired flow rate. Therefore, different valves formed of different components are typically manufactured for achieving different desired flow rates. This increases the cost and complexity of the manufacturing process. Thus, there exists a need for an improved device that can control the flow of fluids over a range of pressure differentials. The device should be cost efficient to manufacture, and preferably should provide a long service life.

BRIEF SUMMARY OF THE INVENTION

The present invention provides a fluid flow control valve and an orifice for such a valve. The orifice defines two seats against which a diaphragm of the valve can be urged. Each seat defines a particular contour, including one or more channels, slots, and or protrusions that form flow control passages through which fluid flows between the diaphragm and the orifice. The orifice can be placed in either of two orientations so that either seat can be disposed toward the diaphragm. As the pressure differential across the valve increases, the diaphragm is urged more firmly against the seat facing the diaphragm and the diaphragm partially closes the flow control passages, thereby regulating the flow to a substantially uniform volumetric rate. The contours of the two seats can be the same, or each seat can be different to provide a unique controlled flow rate. Thus, the orifice and the valve of the present invention can be used to control a flow of fluid to multiple desired flow rates over a range of pressure differentials, thereby reducing the cost and complexity of the manufacturing process.

According to one embodiment of the present invention, the valve includes a housing that defines a fluid flow passage and an orifice disposed in the fluid flow passage. Each of the first and second seats of the orifice has a main support surface that defines at least one channel, slots, and/or protrusions. A deformable and bendable elastomeric diaphragm is disposed in the fluid flow passage with an end face disposed toward one of the seats of the orifice and urged thereagainst by the flow of fluid through the valve. The orifice can be reversed in the housing so that the diaphragm is disposed against the opposite one of the seats. The diaphragm can also be reversible and can define identical contours on either side. A retainer with a plurality of legs can be provided for engaging the housing and retaining the diaphragm in a coaxially aligned configuration with the orifice. According to one aspect of the invention, an outer surface of the orifice defines frustoconical portions for engaging an inner mating portion of the housing. According to another aspect, the orifice can define a groove on its outer surface for receiving a sealing ring that engages the mating portion of the housing.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 4:
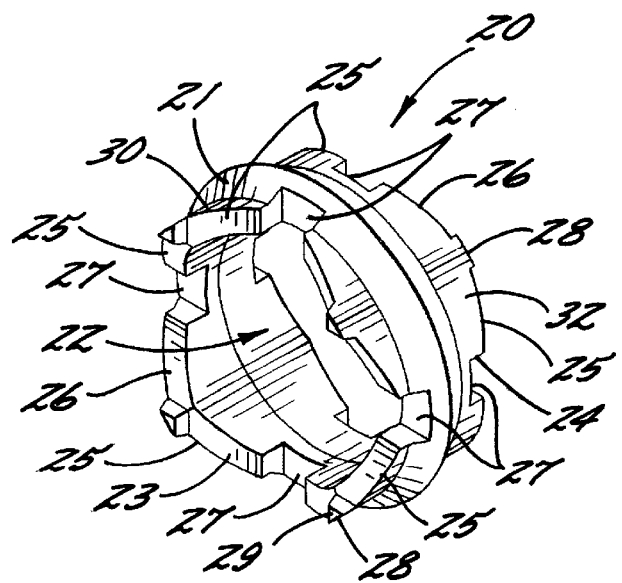
FIG. 4 is a perspective view illustrating an orifice with two seats according to one embodiment of the present invention.
Figure 10:
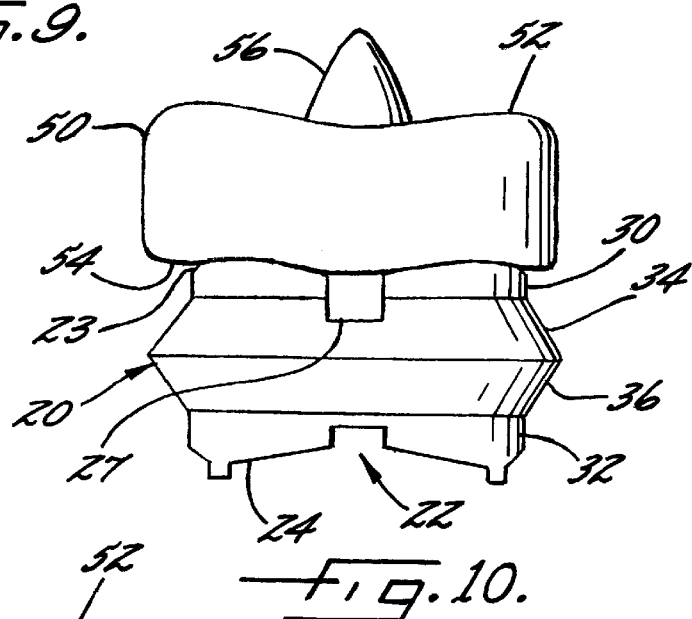
Figure 11:
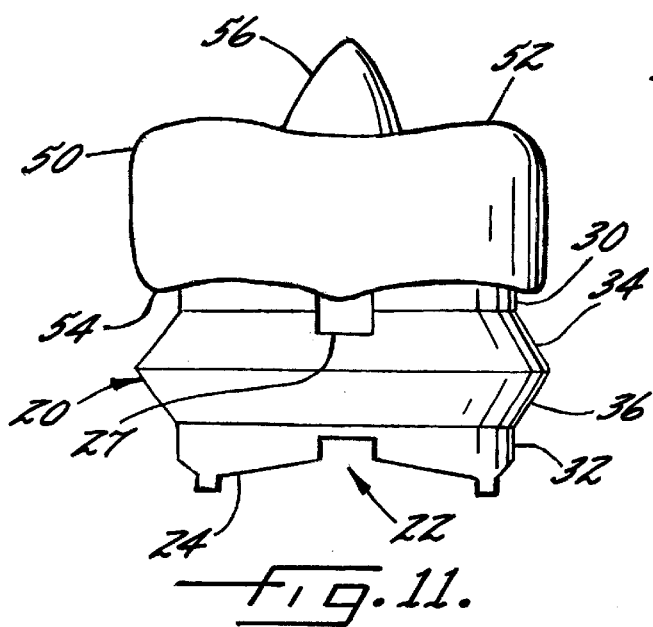

FIG. 10 is an elevation view illustrating the deformation of the diaphragm against the orifice of FIG. 4 at a second predetermined pressure differential, higher than the first predetermined pressure differential; and FIG. 11 is an elevation view illustrating the deformation of the diaphragm against the orifice of FIG. 4 at a third predetermined pressure differential, higher than the second predetermined pressure differential.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Figure 1:
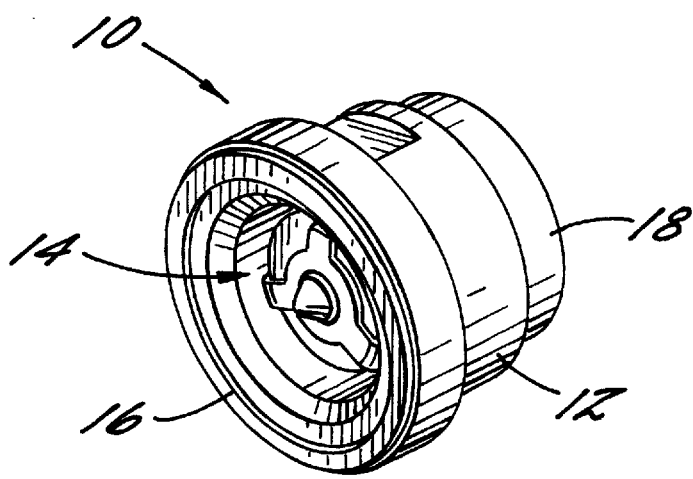
FIG. 1 is a perspective view illustrating a valve according to one embodiment of the present invention.
Figure 2:
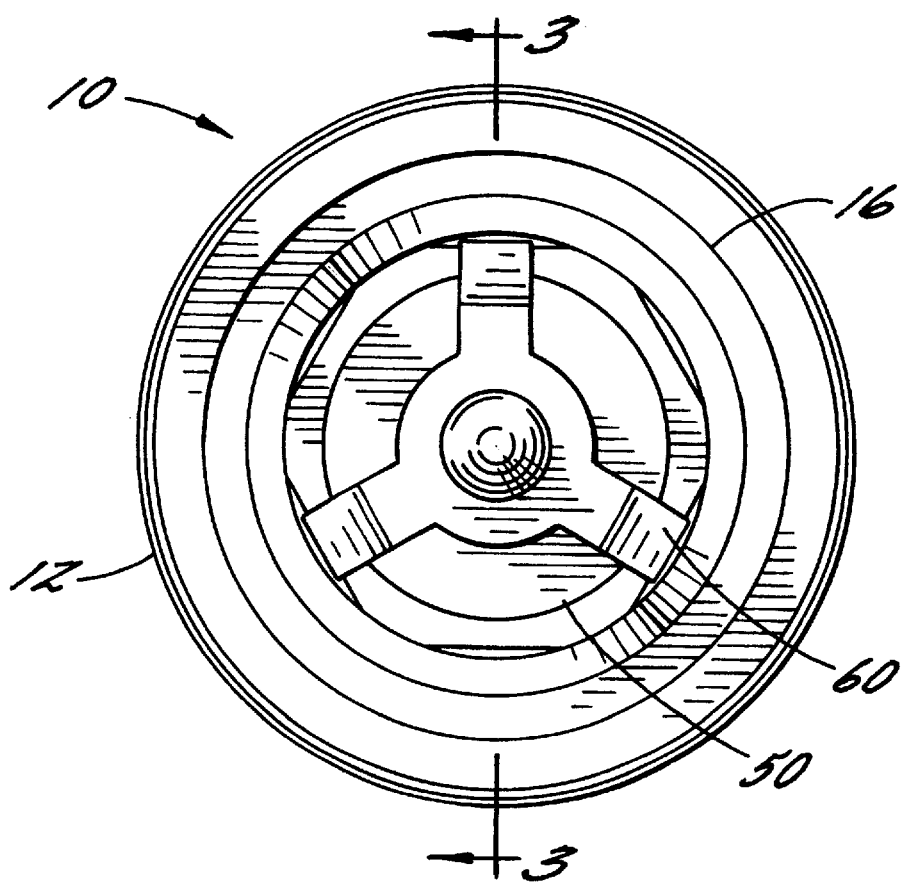
FIG. 2 is an elevation view illustrating the valve of FIG. 1.
Figure 3:
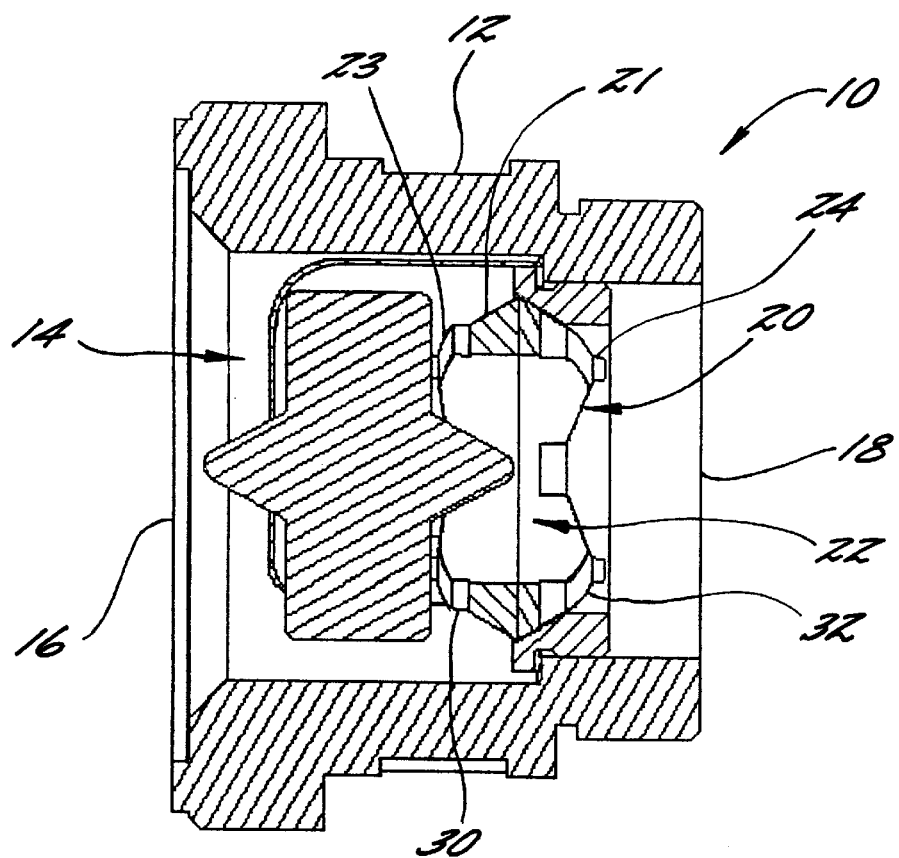
FIG. 3 is a section view illustrating the valve of FIG. 1 as seen along line 3—3 of FIG. 2.

Referring to FIGS. 1–3, there is shown a fluid control valve 10 according to one embodiment of the present invention. The valve 10 includes a housing 12 that forms a generally tubular structure with a longitudinal fluid flow passage 14 extending therethrough from an inlet 16 to an outlet 18. The inlet 16 and outlet 18 of the housing 12 are configured to be attached in any suitable manner to fluid-conducting conduits. For example, the ends of the valve 10 can be threaded to engage inlet and outlet pipes (not shown). The terms "inlet" and "outlet," and corresponding terms "upstream" and "downstream," are used in the present specification and claims with reference to a normal forward direction of fluid flow through the valve 10 in which the flow rate is to be controlled in a desired manner. It will be understood, however, that the valve 10 is also capable of passing fluid in a reverse direction, i.e., upstream from the outlet to the inlet.

As shown in FIG. 3, an orifice 20 is disposed within the flow passage 14 of the housing 12 and has a generally tubular outer wall or support portion 21 with a diameter that is slightly less than the diameter of the inner surface of the housing 12. The orifice 20, shown individually in FIG. 4, also has a central flow passage 22 that extends therethrough. First and second seats 23, 24 are defined at first and second ends of the orifice 20, respectively. In FIG. 3, the orifice 20 is configured so that the first seat 23 is directed toward the inlet of the housing 12, but the orifice 20 can also be positioned in the housing 12 so that the second seat 24 is directed toward the inlet 16, as further described below. Each of the seats 23, 24 is formed on a tubular portion 30, 32 of the orifice 20 that has a smaller diameter than that of the tubular support portion 21 and is joined to the tubular support portion 21 concentrically therewith.

Figure 5:
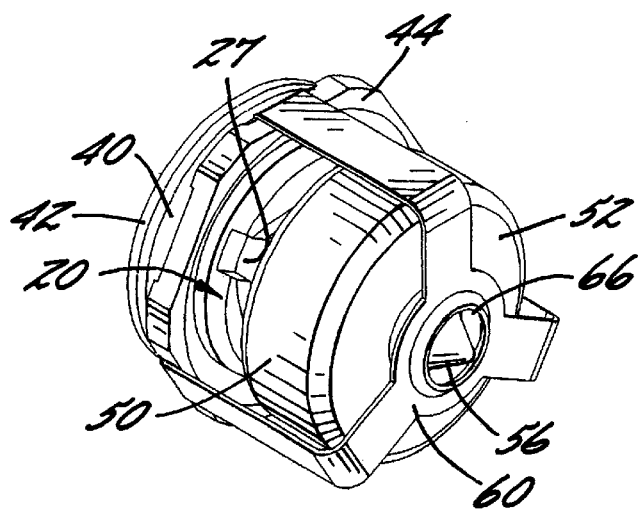
FIG. 5 is a partial assembly view illustrating an orifice, diaphragm, retainer, and holder nut according to one embodiment of the present invention.
Figure 6:
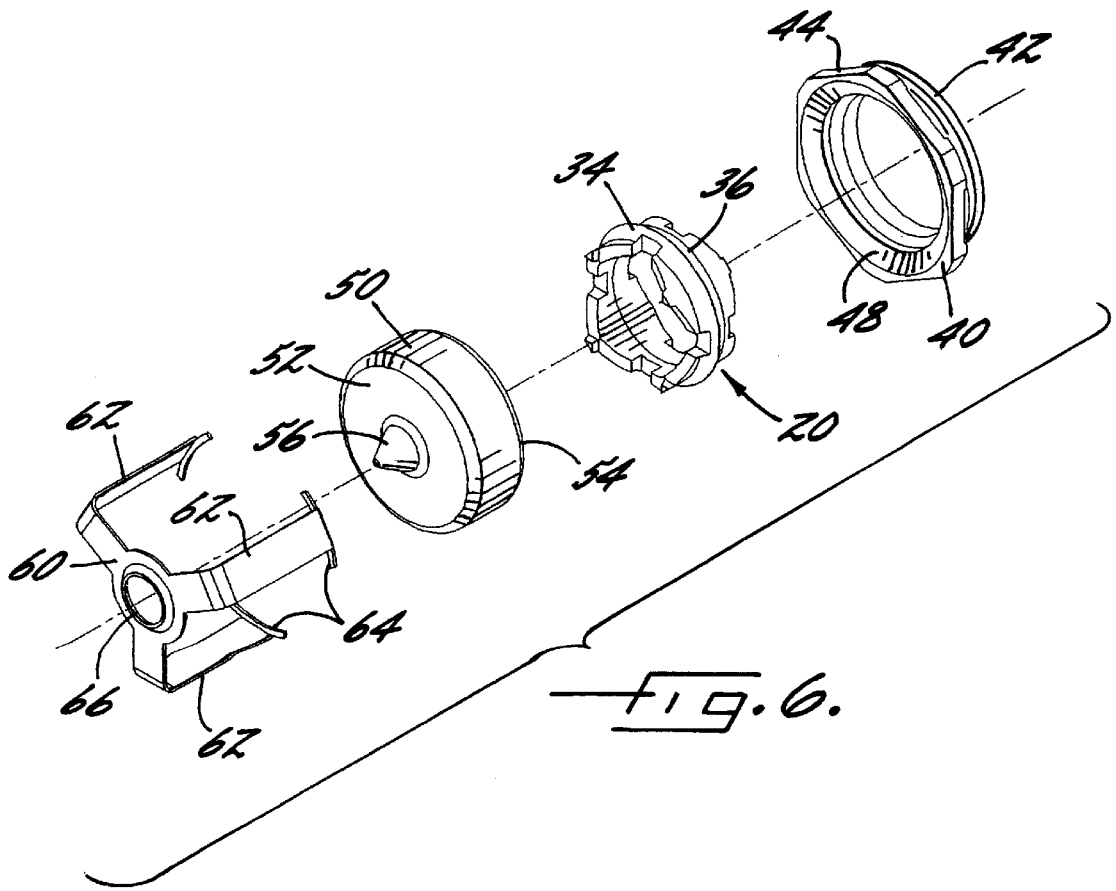
FIG. 6 is a partial exploded view illustrating the components of FIG. 5.
Figure 7:
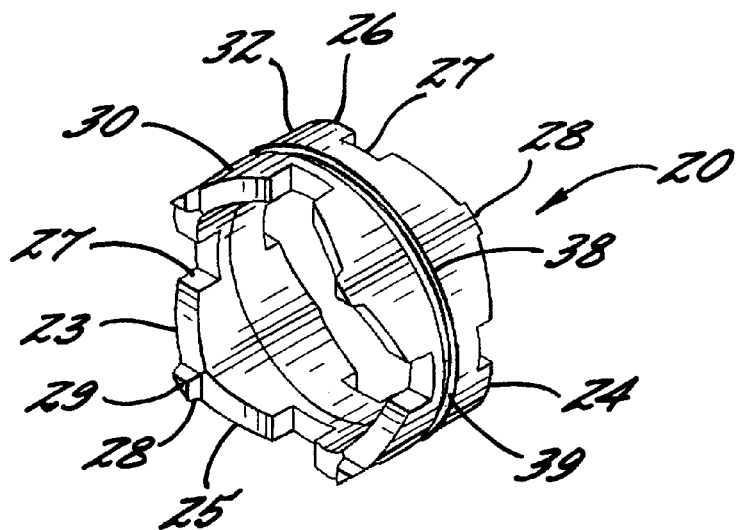
FIG. 7 is a perspective view of an orifice with a groove and sealing ring according to another embodiment of the present invention.

FIGS. 5 and 6 illustrate the internal components of the valve 10, including the orifice 20, a holder nut 40, a diaphragm 50, and a retainer 60. The holder nut 40, which forms a part of the housing 12, can be integral thereto or removable as shown. For example, the holder nut 40 can define a connection portion 42 that is threaded to engage a threaded inner portion of the housing 12. A grip portion 44 of the holder nut 40 can be provided to facilitate insertion and removal of the holder nut 40. The holder nut 40 partially receives the orifice 20, and the tubular support portion 21 of the orifice 20 seals against the holder nut 40 to prevent fluid from flowing downstream between the orifice 20 and the holder nut 40. For example, as shown in FIG. 6, the holder nut 40 can have a frustoconical inner surface 48 that mates with either of corresponding frustoconical portions 34,36 of the support portion 21. The frustoconical portions 34, 36 of the orifice 20 taper in opposite directions such that the first portion 34 seals against the holder nut 20 when the first seat 23 of the orifice 20 is urged against the holder nut 40 and the second portion 36 seals against the holder nut 40 when the orifice 20 is reversed so that the second seat 24 is urged against the holder nut 40. As shown in FIG. 7, an alternative embodiment of the orifice 20 defines a groove 38 that extends around the support portion 21 for receiving a sealing ring 39, such as an elastomeric o-ring. The sealing ring 39 forms a seal between the orifice 20 and the holder nut 40 when the orifice 20 is inserted into the nut 40. In yet another embodiment (not shown), the sealing ring 39 can be used in conjunction with the frustoconical portions 34, 36 for sealing between the orifice 20 and the holder nut 40.

Figure 8:
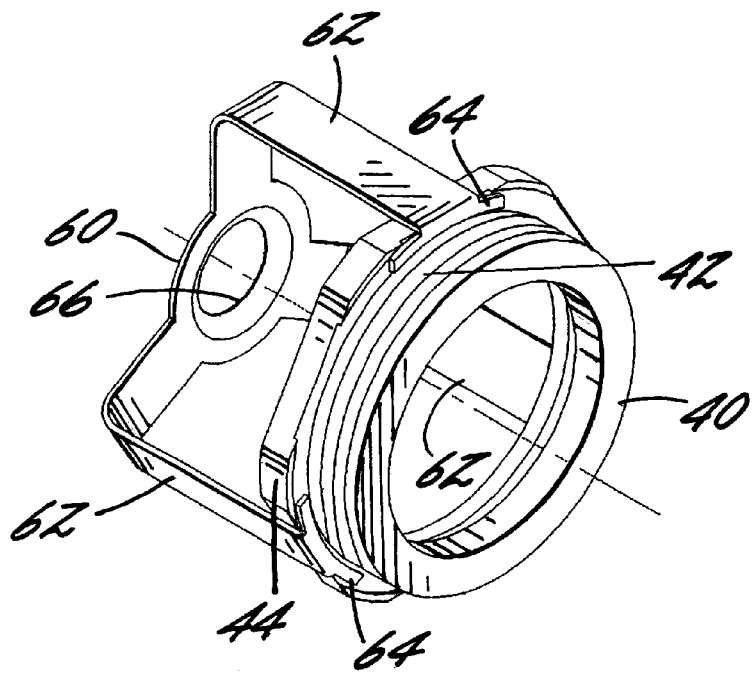
FIG. 8 is a partial assembly view illustrating the retainer and holder nut of FIG. 5, shown without the orifice and diaphragm for illustrative clarity.

For purposes of illustrative clarity, FIG. 8 illustrates the holder nut 40 and the retainer 60 without the orifice 20 and the diaphragm 50. The retainer 60 is positioned upstream of the orifice 20 and has three legs 62 in the illustrated embodiment, though any number of legs 62 can be provided. The legs 62 are circumferentially spaced from one another and extend from the holder nut 40 in the upstream direction beyond the seats 23, 24 of the orifice 20. The legs 62 comprise generally beam-shaped members in the illustrated embodiment, but other shapes can be used instead. The legs 62 of the retainer 60 engage the housing 12 to secure the retainer 60 to the housing 12. For example, flanges 64 can extend radially inward from the legs 62 toward the connection portion 42 of the holder nut 40. Further, the flanges 64 of the retainer 60 can be secured against the grip portion 44 when the connection portion 42 is connected to the housing 12. For example, the connection portion 42 can be threaded into the housing 12 until the flanges 64 of the retainer 60 are secured between the grip portion 44 and the housing 12. Alternatively, the retainer 60 can be formed integrally with the orifice 20, holder nut 40, or the housing 12.

The diaphragm 50, which can comprise a solid disc-shaped piece of a resiliently deformable or elastomeric material, acts in conjunction with the orifice 12 to control the rate of fluid flow through the valve 10 in the forward direction. The outer peripheral surface of the diaphragm 50 is substantially cylindrical and has a diameter sized to allow the diaphragm 50 to fit between the legs 62 of the retainer 60. Preferably, there is sufficient radial clearance between the diaphragm 50 and the legs 62 to allow the diaphragm 50 to freely move axially in the upstream and downstream directions, but the retainer 60 corresponds closely enough in diameter with the diaphragm 50 that the retainer 60 keeps the diaphragm 50 in an approximately coaxial relationship with the orifice 20. As shown in FIG. 3, the diaphragm 50 is preferably non-foraminous, i.e., the diaphragm 50 does not define openings extending therethrough.

The diaphragm 50 has opposite end faces 52, 54, which can be planar surfaces or can define a cone, sphere, or other shape, preferably a shape of a surface of a body of revolution so that the diaphragm 50 can be rotated about its axis without affecting the interface between the diaphragm 50 and the respective seat 23, 24 of the orifice 20. For example, each of the end faces 52, 54 of the diaphragm 50 can have a flow-straightening cone 56 formed thereon. The retainer 60 can also define an aperture 66 that receives a portion of the end face 52, 54 of the diaphragm 50 that is directed away from the orifice 20. For example, as shown in FIG. 5, the aperture 66 can receive either of the cones 56 extending from the end faces 52, 54 of the diaphragm 50 and maintain the diaphragm 50 in axial alignment with the orifice 20.

The end faces 52, 54 of the diaphragm 50 can be identical to each other so that if the face 52, 54 against the seat 23, 24 becomes permanently deformed or worn after prolonged use, the diaphragm 50 can be reversed so that the other face 52, 54 is positioned against the seat 23, 24, thus extending the useful life of the diaphragm 50. Alternatively, the end faces 52, 54 of the diaphragm 50 can be dissimilar so that different flows can be achieved by reversing the orientation of the diaphragm 50. In that way, a single diaphragm 50 can be manufactured and used for achieving different flow characteristics.

In operation, forward fluid flow through the valve 10 causes the diaphragm 50 to be moved against the seat 23, 24 of the orifice 20 that is facing the diaphragm 50, i.e., the active seat. The legs 62 of the retainer 60 align the diaphragm 50 in the radial direction so that the end face 52, 54 of the diaphragm 50 facing the orifice 20 contacts the active seat 23, 24 about its circumference. The legs 62 also space the diaphragm 50 away from the inner surface of the housing 12 so that a consistent and predictable flow passage exists between the outer peripheral surface of the diaphragm 50 and the inner surface of the housing 12. The fluid flows through this flow passage, and then is turned by the tubular support portion 21 of the orifice 20 so as to flow radially inwardly and through flow control passages defined between the end face 52, 54 of the diaphragm 50 and the seat 23, 24, out the central passage 22 of the orifice 20, and out the outlet 18 of the housing 12.

Each of the seats 23, 24 is contoured to be non-planar and can include, for example, grooves or channels 25 that extend in a generally radial direction and form the flow control passages. As the pressure differential across the diaphragm 50 increases, the diaphragm 50 is pressed with greater and greater pressure against the active seat 23, 24 and deforms so as to conform to a greater and greater extent with the contour of the active seat 23, 24. Accordingly, the flow passages between the diaphragm 50 and the active seat 23, 24 become smaller and smaller, compensating for the increasing pressure differential so as to maintain the volumetric flow rate through the valve 10 substantially constant, at least over a particular range of pressure differentials, such as about 0.1 bar to 10 bars. The particular flow rates associated with the two seats 23, 24 can be the same or different. For example, the seats 23, 24 can be the same so that the orifice 20 can be assembled with either seat 23, 24 facing the diaphragm 50 to achieve the same flow rate. This can simplify the assembly of the valve 10 and also allow the orifice 20 to be reversed if one of the seats 23, 24 is defective or becomes damaged or worn. Alternatively, the seats 23, 24 can be configured so that the two seats 23, 24 achieve different flow rates. Thus, by choosing the orientation of the orifice 20 in the valve 10, a single orifice 20 can be used to produce valves 10 with either of two different flow rates, thereby reducing the cost and complexity of the manufacturing process.

As shown in FIG. 4, each seat 23, 24 of the orifice 10 can have a main support surface 26 that is generally normal to the longitudinal axis of the orifice 10, and the main support surface 26 can define the plurality of channels 25 that extend in a direction radial to the longitudinal axis of the orifice 20. For example, portions of the main support surface 26 can be sloped in the longitudinal direction around the orifice 20 so that the main support surface 26 defines a plurality of v-shaped channels 25. The orifice 20 illustrated in FIG. 4 has four of the channels 25, which are spaced evenly about the circumference of the seats 23, 24. The four channels 25 defined by the first seat 23 are equal in size but larger than the channels 25 of the second seat 24. Alternatively, each main support surface 26 of each orifice seat 23, 24 can define channels 25 of different sizes and slopes, and some portions of the main support surfaces 26 can be normal to the longitudinal axis of the orifice 20.

The orifice 20 can also define longitudinal slots 27 in the main support surfaces 26. The longitudinal slots 27 shown in FIGS. 4 and 7 extend radially from the longitudinal axis of the orifice 20, though the slots 27 can be configured at other angles in other embodiments. The slots 27 can be provided at various positions in the seats 23, 24, for example, where the sloped portions of the channels 25 in the main support surfaces 26 converge, i.e., at the bottom of the channels 25, as shown in FIGS. 4 and 7.

Further, the orifice seats 23, 24 can define a plurality of protrusions 28 that extend away from the main support surfaces 26 and, hence, away from the tubular support portion 21 of the orifice 20 so that the protrusions 28 of the active seat 23, 24 extend upstream toward the diaphragm 50. The protrusions 28 have contact faces 29 for contacting the end face 52, 54 of the diaphragm 50. The protrusions 28 engage the end face 52, 54 of the diaphragm 50 so as to hold the end face 52, 54 off the main support surface 26 of the active seat 23, 24 at low pressure differentials. In the illustrated embodiment, there are four of the protrusions 28 spaced circumferentially about 90 degrees apart from one another, though other arrangements of the protrusions 28 are also within the scope of the present invention. For example, other numbers of protrusions 28 can be provided on each seat 23, 24, the protrusions 28 can be placed in other configurations, and the protrusions 28 can be provided on only one or neither of the seats 23, 24.

Each of the seats 23, 24 of the orifice 20 can be contoured to provide at least two different shapes of channels 25, slots 27, and/or protrusions 28, and each shape can be designed to regulate flow at a particular range of pressure differentials. U.S. Pat. No. 6,390,122, the entirety of which is incorporated herein by reference, describes an orifice with channels and protrusions that affect the bending of a diaphragm urged thereagainst by fluid flow. As described in that patent, channels of different widths can be configured to be fully closed by the diaphragm at different pressure differentials. For example, relatively wide channels can be configured to be fully closed by the diaphragm at a pressure of about 1.2 bars, and relatively narrow channels can be configured to be fully closed at a pressure differential of about 3 bars. Thus, the seats 23, 24 can be designed to operate effectively over a range of pressure differentials.

Figure 9:
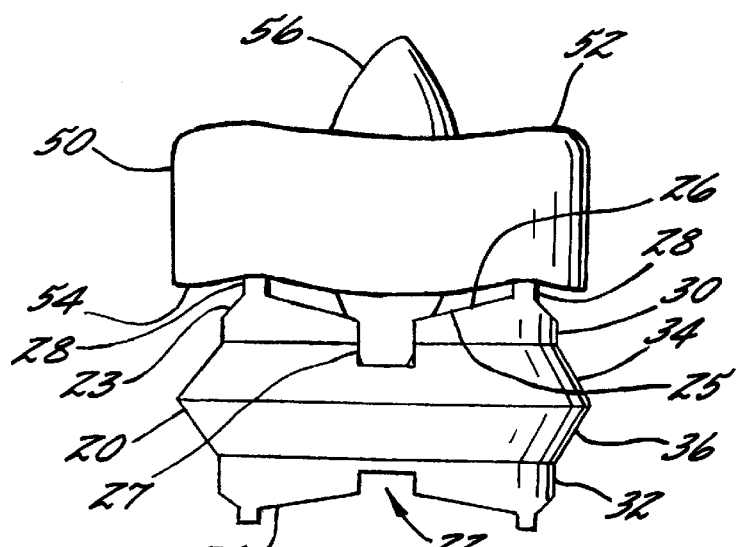
FIG. 9 is an elevation view illustrating the deformation of the diaphragm against the orifice of FIG. 4 at a first predetermined pressure differential.

Due to fluid flowing through the valve 10, a pressure differential is created between the inlet 16 and outlet 18 of the valve 10. Preferably, the orifice 20 is formed of a rigid material, and the pressure differential causes the diaphragm 50 to be urged against the active seat 23, 24 of the orifice 20 that is directed toward the diaphragm 50. FIGS. 9–11 illustrate first, second, and third pressure differential conditions, respectively, for the first seat 23 of the orifice 20. At a low pressure differential, the diaphragm 50 is supported and held off the main support surface 26 of the orifice seat 23 by the protrusions 28 and bends between the protrusions 28 until, at a first predetermined pressure differential, the diaphragm 50 bends into the channels 25 and begins to contact the main support surface 26. As the pressure differential is increased to a second predetermined pressure differential, the protrusions 28 will be fully enveloped by the diaphragm 50 and thereafter will cease to affect the flow rate through the valve 10 as the pressure differential is further increased. With increasing pressure differential, the diaphragm 50 progressively bends to a greater and greater extent so as to seat against more and more of the seat 23 until a third predetermined pressure differential is reached at which the diaphragm 50 makes full contact with the entire main support 26 surface and begins to engage the slots 27 in the main support surface 26. This initial engagement of the slots 27 typically occurs near the upper end of the working range of pressure differentials for the valve 10. The first, second, and third predetermined pressure differentials and the flow rates associated with each pressure differential can be the same for the different seats 23, 24 of the orifice 20 or each seat 23, 24 can define a unique configuration of channels 25, slots 27, and/or protrusions 28 so that each seat 23, 24 controls the flow through the valve 10 to a particular volumetric rate over a range of pressure differentials.

In accordance with the present invention, the channels 25, the protrusions 28, and the diaphragm 50 can be designed so as to cooperatively act to promote simple supported beam-type bending of the diaphragm 50 between the protrusions 28 and into the channels 25 as the pressure differential across the valve 10 increases. Thus, the deflection of the diaphragm 50 can be predicted with good accuracy, enabling accurate control of the sizes of the flow passages at various pressure differentials, such as between about 0.1 bar and 10 bars. In order to promote bending of the diaphragm as opposed to local deformation, the protrusions 28 and surfaces of the orifice seat 23, 24 and the diaphragm 50 can be designed so that the protrusions 28 are capable of supporting the forces for bending the diaphragm 50 without being prematurely enveloped by the diaphragm 50. That is, if the contact faces 29 of the protrusions 28 were too small, the protrusions 28 would tend to locally press into and deform the diaphragm 50 with relatively little force on the diaphragm 50 and thus the diaphragm 50 would not bend to any significant extent.

It will also be appreciated that the force required to bend the diaphragm 50 a given amount depends on the stiffness of the diaphragm 50, which is indicated by the Shore A durometer hardness of the material, and the length-to-diameter ratio of the diaphragm 50. Thus, the higher the durometer hardness, the less the diaphragm 50 will bend for a given force or pressure differential, all other factors being equal. Likewise, the greater the length-to-diameter ratio of the diaphragm 50, the less the diaphragm 50 will bend for a given force or pressure differential. To promote bending of the diaphragm 50, all of these variables must be taken into account. It will also be understood that there is a lower limit to how easily bendable the diaphragm 50 can be made for a variety of reasons including durability and the desire to minimize long-term creep of the diaphragm 50.

Although no general rule of thumb can be given for the selection of the diaphragm length-to-diameter ratio, diaphragm durometer hardness, and contact areas 29 for the protrusions 28 that will be universally applicable in all cases, in general the length-to-diameter ratio preferably should be about 0.1:1 to about 0.47:1. The Shore A durometer hardness of the diaphragm 50 preferably should be about 55 to 69. Of course, in other applications these variables can be manipulated in different ways such that they may not necessarily fall within these ranges. Thus, these ranges are given solely by way of non-limiting example. The height of the protrusions 28, the spacing distance between the protrusions 28, and the surface area of their contact faces 29 in general can be determined by mathematically modeling the beam-type bending of the diaphragm 50 between the protrusions 28, such that the protrusions 28 are suitably shaped to support bending forces required to bend the diaphragm 50.

Many modifications and other embodiments of the inventions set forth herein will come to mind to one skilled in the art to which these inventions pertain having the benefit of the teachings presented in the foregoing descriptions and the associated drawings. For example, although the valve 10 shown and described above has the orifice arranged in the housing 12 such that the central longitudinal axis of the orifice 20 is parallel with the main flow direction through the housing 12, in other types of valves 10 the orifice 20 may be oriented with its longitudinal axis non-parallel to the main flow direction, and even at 90 degrees to the main flow direction. Thus, the invention is not limited to any particular orifice orientation. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A fluid flow control valve for controlling a flow of fluid, the valve comprising:
   a housing defining an inlet, an outlet, and a fluid flow passage extending therebetween;
   an orifice disposed in the fluid flow passage of the housing, the orifice having a first end defining a first seat and a second end defining a second seat, each seat having a main support surface defining at least one channel therein, each channel extending in a generally radial direction of the orifice; and
   a deformable and bendable elastomeric diaphragm disposed in the fluid flow passage of the housing, the diaphragm having an end face that is urged against a respective one of the seats of the orifice by the flow of fluid through the valve,
   wherein the orifice is configured to be positioned in either a first orientation or a second orientation, the first orientation having the first seat opposing the diaphragm, and the second orientation having the second seat opposing the diaphragm.

2. A fluid flow control valve according to claim 1 wherein the first and second seats define similar contours such that the valve provides a first controlled flow rate when the orifice is positioned in either the first or second orientation.

3. A fluid flow control valve according to claim 1 wherein the first and second seats define dissimilar contours, such that the valve provides a first controlled flow rate when the orifice is in the first orientation and the valve provides a second controlled flow rate when the orifice is in the second orientation, the second controlled flow rate being different than the first controlled flow rate.

4. A fluid flow control valve according to claim 1 wherein the orifice has an outer surface defining first and second frustoconical portions, the first frustoconical portion tapering in a direction toward the first seat and the second frustoconical portion tapering in a direction toward the second seat, and wherein the housing has an inner surface defining a mating portion configured to engage a respective one of the frustoconical portions of the orifice to prevent fluid flow between the mating portion and the respective frustoconical portion.

5. A fluid flow control valve according to claim 1 wherein the orifice has an outer surface defining a groove for receiving a sealing ring and the housing has an inner surface defining a mating portion configured to engage the sealing ring to prevent fluid flow between the mating portion and the orifice.

6. A fluid flow control valve according to claim 1 further comprising a retainer having a plurality of legs extending from the diaphragm to the housing and configured to engage the housing and thereby retain the diaphragm in a coaxially aligned configuration with the orifice.

7. A fluid flow control valve according to claim 1 further comprising a retainer having a plurality of legs extending from the diaphragm to the housing, the housing including a holder nut defining a connection portion and a grip portion, the connection portion configured to engage an outer portion of the housing and the grip portion being proximate to and relatively wider than the connection portion, each leg having a flange configured to extend proximate to the grip portion such that the flanges are engaged between the holder nut and the outer portion of the housing when the holder nut is engaged with the outer portion of the housing, thereby retaining the diaphragm in a coaxially aligned configuration with the orifice.

8. A fluid flow control valve according to claim 1 wherein at least one of the seats defines a slot formed in at least one of the channels.

9. A fluid flow control valve according to claim 1 wherein at least one of the seats defines at least two protrusions extending from the respective main support surface for contacting the diaphragm when the diaphragm is urged against the respective seat and holding the diaphragm off the respective main support surface at low pressure differentials.

10. A fluid flow control valve according to claim 1 wherein said diaphragm has first and second end faces of identical contour such that both end faces of the diaphragm are configured to engage either of the seats of the orifice.

11. A fluid flow control valve for controlling a flow of fluid, the valve comprising:
   a housing defining an inlet, an outlet, and a fluid flow passage extending therebetween;
   an orifice disposed in the fluid flow passage of the housing, the orifice having a first end defining a first seat and a second end defining a second seat, each seat having a main support surface defining at least one channel therein, each channel extending in a generally radial direction of the orifice;
   an elastomeric diaphragm disposed in the fluid flow passage of the housing, the diaphragm having an end face that is urged against a respective one of the seats of the orifice by the flow of fluid through the valve; and
   a retainer having a plurality of legs extending from the diaphragm to the housing and configured to retain the diaphragm in a coaxially aligned configuration with the orifice,
   wherein the first and second seats define dissimilar contours and the orifice is configured to be positioned in the housing in either a first orientation or a second orientation, the first orientation having the first seat opposing the diaphragm, and the second orientation having the second seat opposing the diaphragm, the valve thereby configured to provide a first controlled flow rate when the orifice is in the first orientation and a second controlled flow rate when the orifice is in the second orientation.

12. A fluid flow control valve according to claim 1 wherein the orifice has an outer surface defining first and second frustoconical portions, the first frustoconical portion tapering in a direction toward the first seat and the second frustoconical portion tapering in a direction toward the second seat, and wherein the housing has an inner surface defining a mating portion configured to engage a respective one of the frustoconical portions of the orifice to prevent fluid flow between the mating portion and the respective frustoconical portion.

13. A fluid flow control valve according to claim 11 wherein the orifice has an outer surface defining a groove for receiving a sealing ring and the housing has an inner surface defining a mating portion configured to engage the sealing ring to prevent fluid flow between the mating portion and the orifice.

14. A fluid flow control valve according to claim 11 wherein at least one of the seats defines a slot formed in at least one of the channels.

15. A fluid flow control valve according to claim 11 wherein at least one of the seats defines at least two protrusions extending from the respective main support surface for contacting the diaphragm when the diaphragm is urged against the respective seat and holding the diaphragm off the respective main support surface at low pressure differentials.

16. A fluid flow control valve according to claim 11 wherein said diaphragm has first and second end faces of identical contour such that both end faces of the diaphragm are configured to engage either of the seats of the orifice.

17. An orifice for a fluid flow control valve having a diaphragm that is urged against one of two seats of the orifice by fluid flow through the valve, the orifice comprising:
   a tubular support portion extending longitudinally from a first end to a second end and defining a first seat at the first end and a second seat at the second end, each seat extending circumferentially around a central longitudinal axis of the orifice and having a main support surface defining a plurality of channels therein, the channels extending in a generally radial direction of the orifice.

18. An orifice according to claim 17 wherein the first and second seats define similar contours such that the valve provides a controlled flow rate when the diaphragm is urged against the first seat and the valve provides the same controlled flow rate when the diaphragm is urged against the second seat.

19. An orifice according to claim 17 wherein the first and second seats define dissimilar contours, such that the valve provides a first controlled flow rate when the diaphragm is urged against the first seat and the valve provides a second controlled flow rate when the diaphragm is urged against the second seat.

20. An orifice according to claim 17 wherein the orifice has an outer surface defining first and second frustoconical portions, the first frustoconical portion tapering in a direction toward the first seat and the second frustoconical portion tapering in a direction toward the second seat, the frustoconical portions configured to engage a housing of the valve to prevent fluid flow between the housing and the orifice.

21. An orifice according to claim 17 wherein the orifice has an outer surface defining a groove that extends circumferentially around the orifice, said groove configured to receive a sealing ring for sealing the orifice with an inner wall of a housing and thereby preventing fluid flow between the orifice and the housing.

22. An orifice according to claim 17 wherein at least one of the seats defines a slot formed in at least one of the channels.

23. An orifice according to claim 17 wherein a respective main support surface of at least one of the seats defines at least two protrusions extending from the respective main support surface for contacting the diaphragm when the diaphragm is urged against the respective seat and holding the diaphragm off the respective main support surface at low pressure differentials.

24. A fluid flow control valve for controlling a flow of fluid, the valve comprising:
   a housing defining an inlet, an outlet, and a fluid flow passage extending therebetween;
   an orifice disposed in the fluid flow passage of the housing, the orifice having a first end defining a first seat and a second end defining a second seat, each seat having a main support surface defining at least one channel therein, each channel extending in a generally radial direction of the orifice; and
   a resiliently deformable non-foraminous diaphragm disposed in the fluid flow passage of the housing, the diaphragm having an end face that is urged against a respective one of the seats of the orifice by the flow of fluid through the valve,
   wherein the orifice is configured to be positioned in either a first orientation or a second orientation, the first orientation having the first seat opposing the diaphragm, and the second orientation having the second seat opposing the diaphragm.

25. A fluid flow control valve according to claim 24 wherein the first and second seats define similar contours such that the valve provides a first controlled flow rate when the orifice is positioned in either the first or second orientation.

26. A fluid flow control valve according to claim 24 wherein the first and second seats define dissimilar contours, such that the valve provides a first controlled flow rate when the orifice is in the first orientation and the valve provides a second controlled flow rate when the orifice is in the second orientation, the second controlled flow rate being different than the first controlled flow rate.

27. A fluid flow control valve according to claim 24 wherein the orifice has an outer surface defining first and second frustoconical portions, the first frustoconical portion tapering in a direction toward the first seat and the second frustoconical portion tapering in a direction toward the second seat, and wherein the housing has an inner surface defining a mating portion configured to engage a respective one of the frustoconical portions of the orifice to prevent fluid flow between the mating portion and the respective frustoconical portion.

28. A fluid flow control valve according to claim 24 wherein the orifice has an outer surface defining a groove for receiving a sealing ring and the housing has an inner surface defining a mating portion configured to engage the sealing ring to prevent fluid flow between the mating portion and the orifice.

29. A fluid flow control valve according to claim 24 further comprising a retainer having a plurality of legs extending from the diaphragm to the housing and configured to engage the housing and thereby retain the diaphragm in a coaxially aligned configuration with the orifice.

30. A fluid flow control valve according to claim 24 further comprising a retainer having a plurality of legs extending from the diaphragm to the housing, the housing including a holder nut defining a connection portion and a grip portion, the connection portion configured to engage an outer portion of the housing and the grip portion being proximate to and relatively wider than the connection portion, each leg having a flange configured to extend proximate to the grip portion such that the flanges are engaged between the holder nut and the outer portion of the housing when the holder nut is engaged with the outer portion of the housing, thereby retaining the diaphragm in a coaxially aligned configuration with the orifice.

31. A fluid flow control valve according to claim 24 wherein at least one of the seats defines a slot formed in at least one of the channels.

32. A fluid flow control valve according to claim 24 wherein at least one of the seats defines at least two protrusions extending from the respective main support surface for contacting the diaphragm when the diaphragm is urged against the respective seat and holding the diaphragm off the respective main support surface at low pressure differentials.

33. A fluid flow control valve according to claim 24 wherein said diaphragm has first and second end faces of identical contour such that both end faces of the diaphragm are configured to engage either of the seats of the orifice.

* * * * *

UNITED STATES PATENT AND TRADEMARK OFFICE
CERTIFICATE OF CORRECTION

PATENT NO.    : 6,595,235 B1
DATED         : July 22, 2003
INVENTOR(S)   : Zhang It is certified that error appears in the above-identified patent and that said Letters Patent is hereby corrected as shown below:

<u>Title page</u>,
Item [73], Assignee, "divison" should read -- division --;
"Romac" should read -- ROMAC --.

<u>Column 8</u>,
Line 43, "t o" should read -- to --.

<u>Column 9</u>,
Line 58, "claim 1" should read -- claim 11 --.

Signed and Sealed this

Second Day of December, 2003

JAMES E. ROGAN
*Director of the United States Patent and Trademark Office*